(12) United States Patent
Sanders

(10) Patent No.: US 8,875,202 B2
(45) Date of Patent: Oct. 28, 2014

(54) PROCESSING PATH SIGNATURES FOR PROCESSING ELEMENTS IN ENCODED VIDEO

(71) Applicant: General Instrument Corporation, Horsham, PA (US)

(72) Inventor: John Sanders, Ramona, CA (US)

(73) Assignee: General Instrument Corporation, Horsham, PA (US)

( * ) Notice: Subject to any disclaimer, the term of this patent is extended or adjusted under 35 U.S.C. 154(b) by 40 days.

(21) Appl. No.: 13/830,504

(22) Filed: Mar. 14, 2013

(65) Prior Publication Data

US 2014/0267786 A1 Sep. 18, 2014

(51) Int. Cl.
*H04N 7/173* (2011.01)
*H04N 17/00* (2006.01)

(52) U.S. Cl.
CPC .................................. *H04N 17/004* (2013.01)
USPC ............................................. 725/93; 725/116

(58) Field of Classification Search
CPC .......... H04N 7/17318; H04N 7/17309; H04N 7/17336; H04N 21/235
USPC ..................... 725/91–96, 114–117, 144–147; 709/217–232
See application file for complete search history.

(56) References Cited

U.S. PATENT DOCUMENTS

| | | | | |
|---|---|---|---|---|
| 4,090,035 A * | 5/1978 | Popkin | ........................... | 370/217 |
| 5,585,858 A * | 12/1996 | Harper et al. | .................. | 348/485 |
| 6,101,108 A * | 8/2000 | Wittenbreder, Jr. | ............. | 363/65 |
| 6,253,193 B1 * | 6/2001 | Ginter et al. | ..................... | 705/57 |
| 6,876,676 B2 * | 4/2005 | Watanabe et al. | .............. | 370/522 |
| 7,130,310 B2 * | 10/2006 | Itawaki et al. | ................. | 370/465 |
| 7,711,554 B2 * | 5/2010 | Mori et al. | ..................... | 704/211 |
| 7,889,743 B2 * | 2/2011 | Evans et al. | .................... | 370/394 |
| 7,926,083 B2 * | 4/2011 | Lecomte et al. | ............... | 725/116 |
| 8,185,732 B2 | 5/2012 | Takashima | | |
| 8,495,693 B2 * | 7/2013 | St. John-Larkin | ............. | 725/114 |
| 8,561,119 B2 * | 10/2013 | Kim et al. | ...................... | 725/118 |
| 2011/0299604 A1 | 12/2011 | Price et al. | | |

\* cited by examiner

*Primary Examiner* — Annan Shang
(74) *Attorney, Agent, or Firm* — Thomas A. Ward

(57) ABSTRACT

In one embodiment, a method receives packets including video data that was encoded or decoded. The packets are dynamically routed through processing elements in different routes and some of the packets include signatures from processing elements that processed each respective packet. The method then determines a plurality of captures each including a set of packets and determines for each capture, a set of processing elements that processed the set of packets. The set of processing units inserted respective signatures into a user data section of the packets that is defined by a standard used to encode or decode the video data. The determined set of processing elements are analyzed for each capture to determine a processing element in the set of processing elements that is considered to be causing a performance degradation. Then, the method performs a remedial action associated with the processing element.

20 Claims, 9 Drawing Sheets

| user_data() { | NO. OF BITS | MNEMONIC |
|---|---|---|
| user_data_start_code | 32 | bslbf |
| while {nextbits() !='0000 0000 0000 0000 0000 0001') } { | | |
| user_data | 8 | uimsbf |
| } | | |
| next_start_code() | | |
| } | | |

300

302 → (points to user_data row)

FIG. 3A

| user_data() { | BITS | |
|---|---|---|
| organization_identifier | 32 | bslbf |
| user_data_type_code | 8 | uimsbf |
| If (user_data_type_code = processing_element_signature) { | | |
| number_signatures | 8 | uimsbf |
| for(i=0, i<number_of_signatures, I++ | | |
| unit_id | 16* | bslbf |
| processor_id | 16* | bslbf |
| } | | |
| } | | |
| } | | |

304

306 → organization_identifier
308 → user_data_type_code
310 → If (user_data_type_code = processing_element_signature) {
312 → number_signatures
314 → for(i=0, i<number_of_signatures, I++
316 → unit_id
318 → processor_id

FIG. 3B

| user_data_registered_itu_t_t35(payloadSize) { | C | DESCRIPTOR |
|---|---|---|
| itu_t_t35_country_code | 5 | b(8) |
| if(itu_t_t35_country_code !=0XFF) | | |
|    i=1 | | |
| else { | | |
|    itu_t_t35_country_code_extension_byte | 5 | b(8) |
|    i=2 | | |
| } | | |
| do { | | |
|    itu_t_t35_payload_byte | 5 | b(8) |
|    i++ | | |
| } while(i<payloadSize) | | |
| } | | |

*FIG. 4A*

| SYNTAX | NO. OF BITS | FORMAT |
|---|---|---|
| user_data_registered_itu_t_t35 () { | | |
|    itu_t_t35_country_code | 8 | bslbf |
|    itu_t_t35_provider_code | 16 | bslbf |
|    user_identifier | 32 | bslbf |
|    user_structure() | | |
| } | | |

*FIG. 4B*

PROCESSING PATH SIGNATURES FOR PROCESSING ELEMENTS IN ENCODED VIDEO

BACKGROUND

Monitoring the performance of networks is important to ensure a quality user experience. For various reasons, when delivering video through a network, performance degradation may result. When this occurs, a system may attempt to determine the cause of the performance degradation. However, determining the cause of the problem may be difficult because the video may be routed through many different processing elements. Also, the video may be processed through dynamically routed networks where packets for the video are dynamically routed differently through different processing elements. This makes identifying which processing elements that are the cause of the problem difficult.

BRIEF DESCRIPTION OF THE DRAWINGS

FIG. 3A shows an example of syntax for a Motion Pictures Experts Group 2 (MPEG2) video standard according to one embodiment.

FIG. 3B shows a more detailed example of the user data section according to one embodiment.

FIG. 4A shows another example of a syntax for inserting a signature in MPEG4 AVC video according to one embodiment.

FIG. 4B shows a syntax that may be used to insert the signature according to one embodiment.

DETAILED DESCRIPTION

Figure 1:
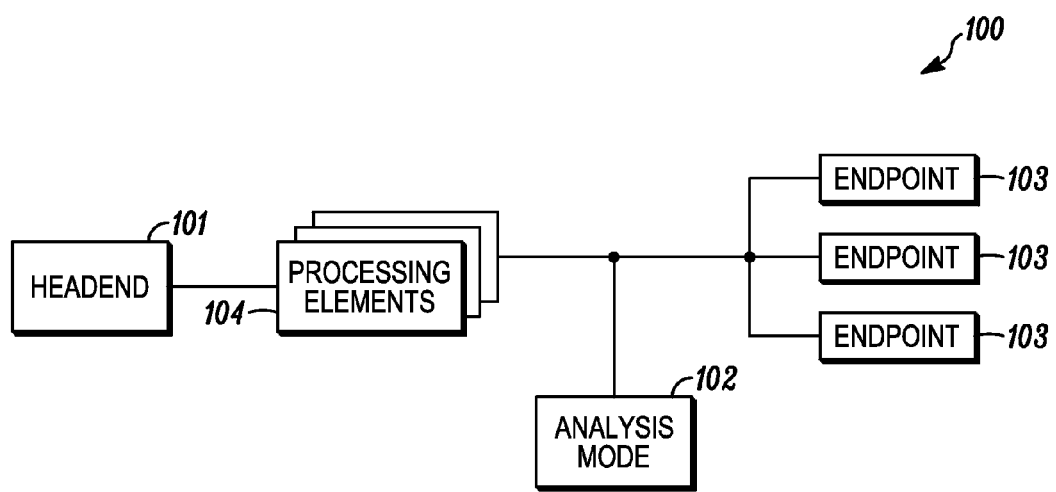
FIG. 1 depicts a simplified system for analyzing video according to one embodiment.

Described herein are techniques for a video analysis system. In the following description, for purposes of explanation, numerous examples and specific details are set forth in order to provide a thorough understanding of particular embodiments. Particular embodiments as defined by the claims may include some or all of the features in these examples alone or in combination with other features described below, and may further include modifications and equivalents of the features and concepts described herein.

In one embodiment, a method receives packets including video data that was encoded or decoded. The packets are dynamically routed through processing elements in different routes and at least some of the packets include signatures from a plurality of processing elements that processed each respective packet. The method then determines a plurality of captures each including a set of packets and determines for each capture, a set of processing elements that processed the set of packets. The set of processing units inserted respective signatures into a user data section of the packets that is defined by a standard used to encode or decode the video data. The determined set of processing elements are analyzed for each capture to determine a processing element in the set of processing elements that is considered to be causing a performance degradation. Then, the method performs a remedial action associated with the processing element considered to be causing the performance degradation.

In another embodiment, a method includes: receiving, by a processing element, a packet including video data, wherein the packet is being dynamically routed through processing elements and other packets including other video data are routed in different routes through processing elements; processing, by the processing element, the video data according to a standard that defines how to encode or decode the video data; inserting, by the processing element, a signature in a user data section defined by the standard, the signature identifying the processing element; routing, by the processing element, the packet including the inserted signature and the processed video data, wherein the signature is included in a plurality of signatures for processing elements that processed the packet, and wherein a plurality of packets with a plurality of signatures for processing elements that processed each respective packet are used to analyze whether the processing element is considered to be causing a performance degradation.

In one embodiment, a non-transitory computer-readable storage medium containing instructions that, when executed, control a computer system to be configured for: receiving packets including video data that was encoded or decoded, wherein the packets are dynamically routed through processing elements in different routes and at least some of the packets include signatures from a plurality of processing elements that processed each respective packet; determining a plurality of captures each including a set of packets; determining for each capture, a set of processing elements that processed the set of packets, wherein the set of processing units inserted respective signatures into a user data section of the packets that is defined by a standard used to encode or decode the video data; analyzing the determined set of processing elements for each capture to determine a processing element in the set of processing elements that is considered to be causing a performance degradation; and performing a remedial action associated with the processing element considered to be causing the performance degradation.

FIG. 1 depicts a simplified system 100 for analyzing video according to one embodiment. Video may be sent from a headend 101 through multiple paths to multiple endpoints 103. Different processing elements 104 may process the video, which may be a movie, television show, or other media program. Processing elements 104 may include encoders or decoders that may encode or decode the video. Also, other video processing elements may be appreciated, such as routers, ad servers that insert ads into the video, and other network elements. The video may be dynamically routed either within an enclosure or through a network. For example, an enclosure may include multiple processing elements 104 that may process the video. Additionally, separate processing elements 104 in separate enclosures may process the video.

An analysis node 102 analyzes the routing of the video to determine a cause of performance degradation. The performance degradation may result because of a failure of a processing element 104 or other problem related to a processing element 104, such as a high load. Because of the dynamically-routed video, analysis node 102 may need to know which route packets including video data were routed through. To help identify the route, particular embodiments cause processing elements 104 to insert a signature into packets within the transport stream that includes the video data. In this way, a packet that is routed through a dynamic route would include signatures for processing elements 104 that processed the packet. Analysis node 102 may then analyze the packets that are received and identify the processing elements 104 that processed the packets. After identification, analysis node 102 can determine which processing elements 104 may be the cause of the performance degradation. Because the signatures for processing elements 104 are added to the packets that include the video data, a close coupling of the signature with the video data is provided. That is, analysis node 102 can associate the video data with which processing element 104 that processed the video data. However, if the signature was added to another stream other than the transport stream, analysis node 102 could not associate which processing element 104 processed which packets carrying which video data. Further, it is possible that the packets in the other stream would also be lost.

Figure 2A:
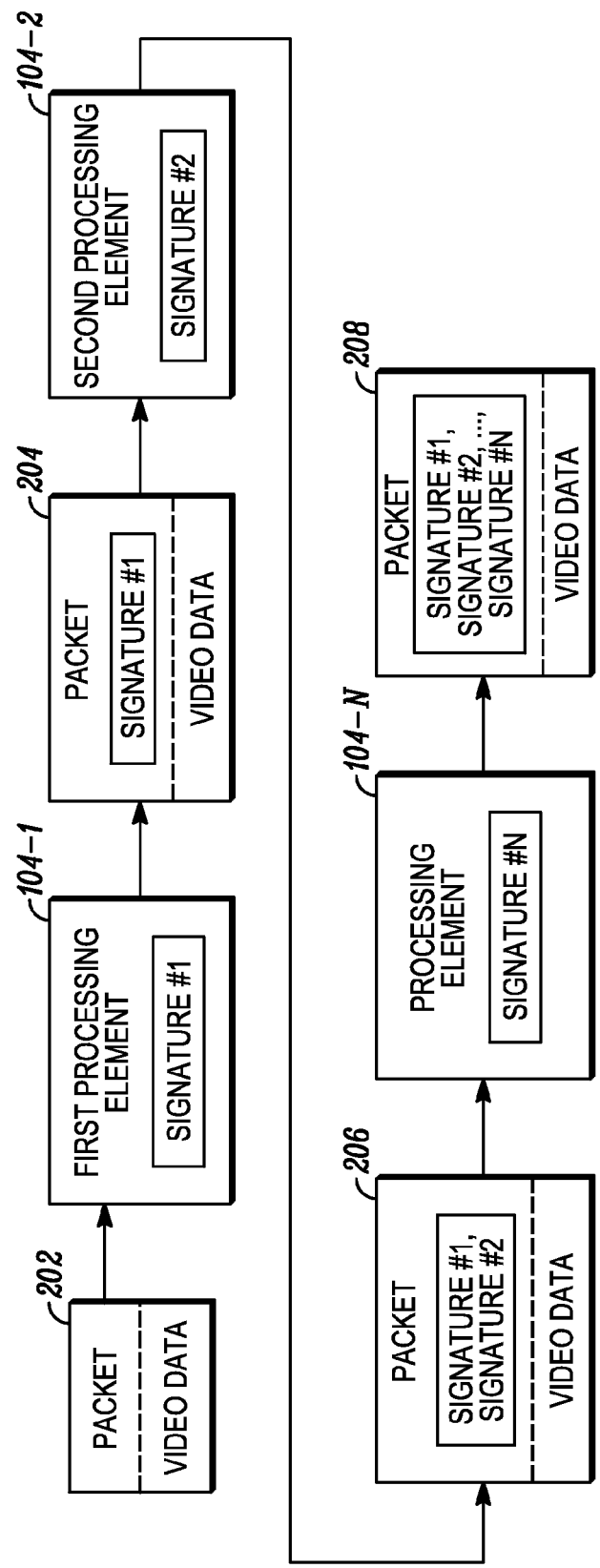
FIG. 2A depicts an example of inserting signatures into a packet for a first route according to one embodiment.

The following shows different routes that can be taken in a dynamic routing environment. FIG. 2A depicts an example of inserting signatures into a packet for a first route according to one embodiment. At 202, a packet includes video data. For example, the video may be encoded or decoded video. A first processing element 104-1 receives the packet and processes the packet. For example, first processing element 104-1 may process video in the packet, such as encoding the video or inserting ads in the video. In other embodiments, first processing element 104-1 may not process the video, but may just be routing the packet. As shown, first processing element 104-1 includes an identifier of a "signature #1". The signature may uniquely identify first processing element 104-1. When first processing element 104-1 processes the packet, processing element 104-1 inserts signature #1 into the packet. As shown at 204, the packet now includes signature #1. As will be discussed in more detail below, the standard used to encode the video includes a syntax that first processing element 104 follows and inserts the signature into a section in a way that complies with the standard.

A second processing element 104-2 receives the packet and also processes the packet. Processing element 104-2 is identified by a signature #2, which is inserted into the packet. As shown at 206, the packet now includes signature #1, signature #2, and the video data.

The packet may then be processed any number of processing elements that are generically represented as processing element 104-N. Processing element 104-N is identified by signature #N, which may be N number of signatures. At 208, the packet is shown as including signature #1, signature #2 . . . , signature #N. Thus, each processing element 104 that processed the packet may have inserted its signature in the packet although it is not a requirement that all processing elements 104 that process the packet actually add a signature. In some cases, only processing elements 104 that perform specific acts, such as encoding or decoding of the video data, may add a signature.

Figure 2B:
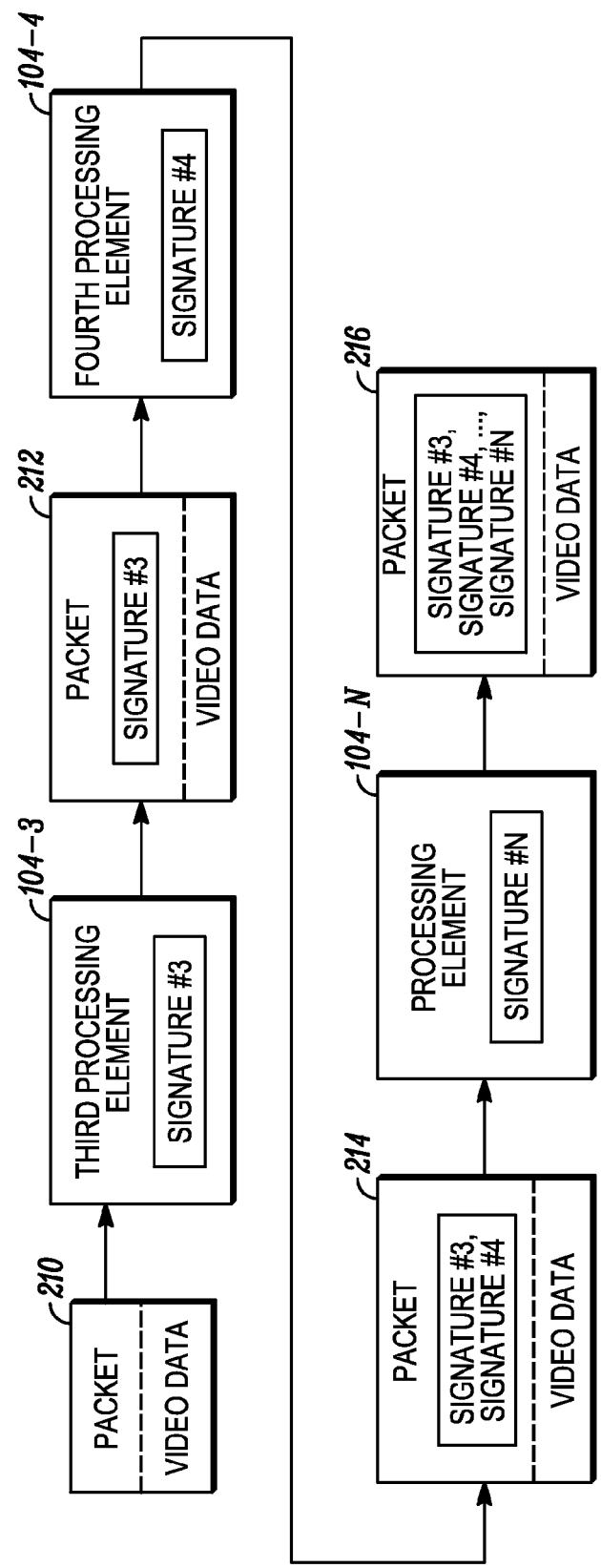
FIG. 2B shows a second route for processing a packet according to one embodiment.

FIG. 2B shows a second route for processing a packet according to one embodiment. This may be another packet may be processed that includes video data. For example, the video data processed in FIG. 2A may have been from a first portion of the video and the video data in the packet shown at 210 may be for a second portion of the video. A third processing element 104-3 may process the packet. Third processing element 104-3 is identified by a signature #3, which is inserted into the packet. At 212, a packet is shown as including signature #3 in addition to the video data. A fourth processing element 104-4 then processes the packet and inserts a signature #4 into the packet. As shown at 214, a packet includes signature #3, signature #4, and the video data.

The packet may then be routed and processed through any number of processing elements 104-N thereafter. At 216, the packet is shown as including signature #3, signature #4, . . . signature #N, and the video data.

Analysis node 102 receives the above two packets (in addition to a number of other packets) and can determine which processing elements 104 processed the packets. Accordingly, by having processing elements 104 insert their signatures in packets that include video data, analysis node 102 can determine routes in which packets were delivered in a dynamic routing environment.

It should be noted that not every packet that is delivered for the video will have signatures inserted by processing elements 104. For example, to reduce overhead, processing elements 104 may only insert a signature at a pre-determined interval, such as when a certain type of frame, such as an instantaneous decoder refresh (IDR) frame, is received. In another example, processing elements 104 may insert their signature only when a signal path switches (e.g., a packet is routed through a different path).

In one embodiment, the packets being routed carry video that is encoded based on a standard, such as MPEG2 or H.264. The standards include syntaxes that define the structure of how the video data should be sent in packets. The packets carrying the video data are elementary stream packets that generally carry a video frame. The elementary stream packets may be different from transport packets, which exist at a different layer of the MPEG specification. Elementary stream packets may be variable length and may be larger than transport packets and are defined by the standard used to encode/decode the video, such as MPEG2 video encoding standard ISO13818 part 2 or MPEG4 Advanced Video Coding standard most commonly referenced as ITU-T H.264. The elementary stream packets carry a complete video frame (e.g., a complete picture) or an audio frame (an arbitrary block of code defined by the audio encoding standard used). Transport packets in this context are fixed length blocks of data, which may be defined by a part of the standard that covers the system layer, such as ISO 13818 part 1 (MPEG2 System). The transport packets carry a payload of 184 bytes and are either 188 or 204 bytes long depending if additional error correction data is carried or not. The transport packets may be aligned to the PES (packetized elementary stream) or elementary stream layers. The PES layer is an intermediate between elementary stream and transport layer and is created by adding a header to the elementary stream packet, containing timing and other information. The PES layer is also defined by the part of the standard that covers the system layer, such as MPEG2 ISO 13818 part 1. Multiple transport packets are normally required to carry a single elementary stream packet.

The syntax is used to encode/decode the video. If the structure of the syntax is not adhered to, then processing elements 104 may not be able to properly encode or decode the video data. In one embodiment, processing elements 104 add their signature in a way that complies with the standard's syntax by adding signatures to a video user data section of the syntax. Within the video user data section, processing elements 104 may insert the signatures according to a syntax. FIG. 3A shows an example of syntax 300 for a Motion Pictures Experts Group 2 (MPEG2) video standard according to one embodiment. Syntax 300 defines a video user data section. The user data section may be where data can be inserted in a format defined by a user. That is, the format of the user data is not part of the standard, but rather can be defined by the user. As described above, the user data section may be included in the transport stream with the video data. In one example, the user data section may be included in the header of the packet that is carrying the video data.

At 302, a syntax user_data is shown. This section is where the signature can be defined in the syntax. FIG. 3B shows a more detailed example of the user_data section according to one embodiment. A syntax 304 shows an example of fields that can be inserted for a signature. At 306, an organization identifier (organization_identifier) identifies an organization responsible for maintaining this user data and may be a four-character code. The organization may be registered with a registration authority. Also, the value may be a standard-based value, such as "GA94" or a private value, such as "MOTO". At 308, a syntax user_data_type_code is a number identifying the data type within the scope of the organization. A specific value may be assigned to video processing signatures.

At 310, syntax 304 tests a conditional statement (e.g., an if statement) if the syntax userdata_type_code equals a syntax processing_element_signature. This tests whether or not that data type is a signature or not. If the data type is a signature, at 312, the syntax number_signatures is a number that is incremented each time a subsequent video processing element 104 adds a signature to this structure. This counts the number of processing elements that have added their signatures.

At 314, a statement allows analysis node 102 to read out all of the signatures that were inserted and also where a processing element 104 should insert a signature next.

At 316, the syntax unit ID is a first part of the signature identifying an enclosure containing processing element 104. At 318, syntax processor_ID is a second part of the signature identifying the processing element 104 that is processing the packet. Although this format of a signature is described, other formats may be used.

FIG. 4A shows another example of a syntax 400 for inserting a signature in MPEG4 AVC video according to one embodiment. Syntax 400 shows data structures that form the supplemental enhancement information (SEI) section for a packet that includes video data. At 402, a syntax itu_t_t35_payload_byte may be used to insert the signature. The syntax defines this section for user data. For example, FIG. 4B shows a syntax 404 that may be used to insert the signature according to one embodiment. At 406, a syntax user_identifier may be identical to the syntax organization_identifier shown at 306 in FIG. 3B. At 408, the syntax user_structure( ) may represent the remainder of the structure shown in FIG. 3B. Thus, the signature may be inserted into the syntax itu_t_t35_payload_byte.

Figure 5:
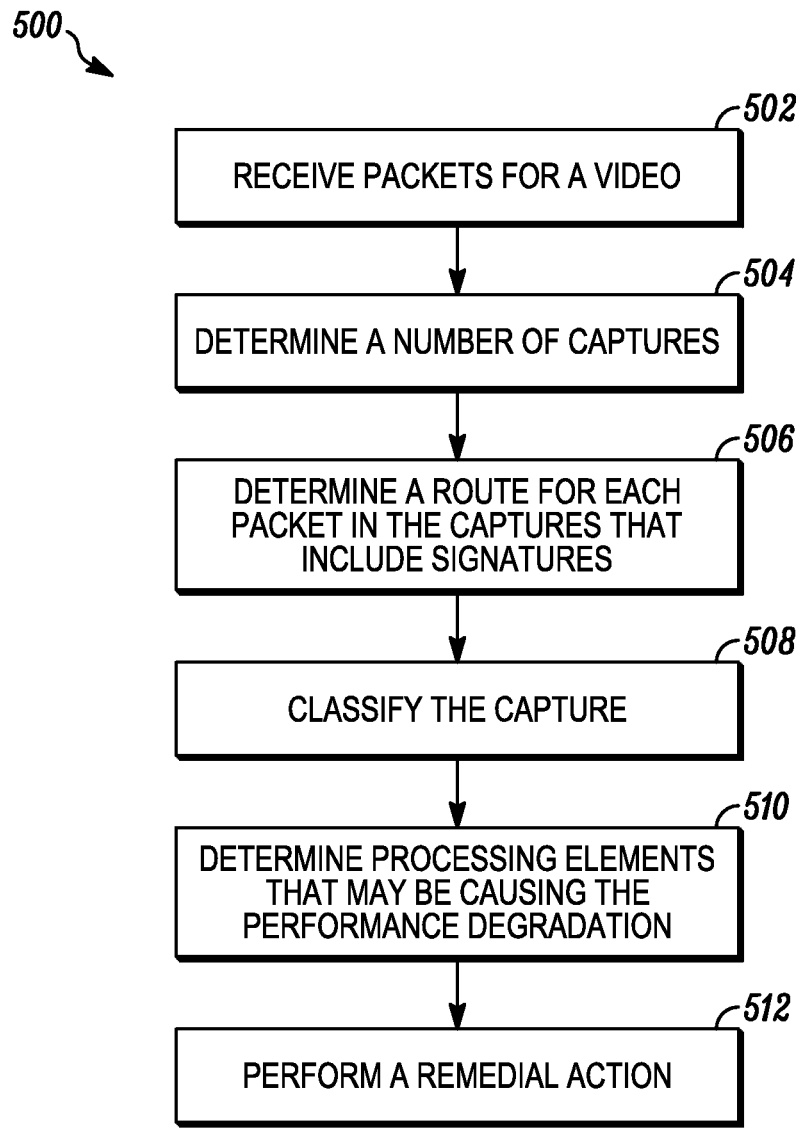
FIG. 5 depicts a simplified flowchart of a method for analyzing packets to determine a cause of performance degradation according to one embodiment.

As mentioned above, analysis node 102 uses the signatures to analyze the performance. FIG. 5 depicts a simplified flowchart 500 of a method for analyzing packets to determine a cause of performance degradation according to one embodiment. At 502, analysis node 102 receives packets for a video. At 504, analysis node 102 determines a number of captures. For example, the captures may include a number of packets, such as a ten-second period of packets. Each capture may include a different ten-second portion. Some of the packets may have signatures included for a route and some packets may not. In one embodiment, analysis node 102 only processes packets that include signatures.

At 506, analysis node 102 determines a route for each packet in the captures that include signatures. For example, analysis node 102 analyzes the user data section in the packets to identify each processing element 104 that processed each packet. At 508, analysis node 102 classifies the capture. The classification may be based on the performance of the packet. For example, a capture may be classified as "bad" if the performance was below a threshold and may be classified as a "good" capture if the performance was above a threshold. In one example, the threshold may be a time taken to route packets in the captures from the head end to the end point. Various other methods may also be used to classify the captures and different classifications may be used.

At 510, analysis node 102 determines processing elements 104 that may be causing the performance degradation. For example, analysis node 102 may return a set of processing elements 104 that may be the cause of the performance degradation. In one example, an element appearing in a bad capture, but not a good capture may possibly be a cause of the performance degradation. When enough captures are analyzed, analysis node 102 may determine that a processing element 104 appears in a large number of bad captures, but a small number of good captures (or no good captures). This may be sufficient for analysis node 102 to indicate that this processing element 104 is a possible cause of the performance degradation. This analysis is made possible because processing elements 104 insert their signatures into packets. A tight correlation between the delivery of the video and the processing elements 104 is provided by inserting signatures directly into packets carrying the video data. Thus, analysis node 102 may identify the processing element 104 that may be causing the problem with video delivery accurately because packets actually delivering the video data are analyzed. This may be different than if the information was not included in the transport stream that includes packets for the video data. For example, if not included in the transport stream, the identification of the processing elements 104 may be lost or not as tightly coupled with the delivery of the video data and may not accurately indicate which processing elements 104 processed which video.

At some point after processing, at 512, analysis node 102 performs a remedial action. For example, analysis node 102 outputs an alert that identifies processing elements 104 that may be causing performance degradation. The alert may be sent to a service representative or users that are receiving the video. In another example, analysis node 102 may automatically attempt to remediate the problem, such as taking a processing element 104 offline or changing a route.

Figure 6:
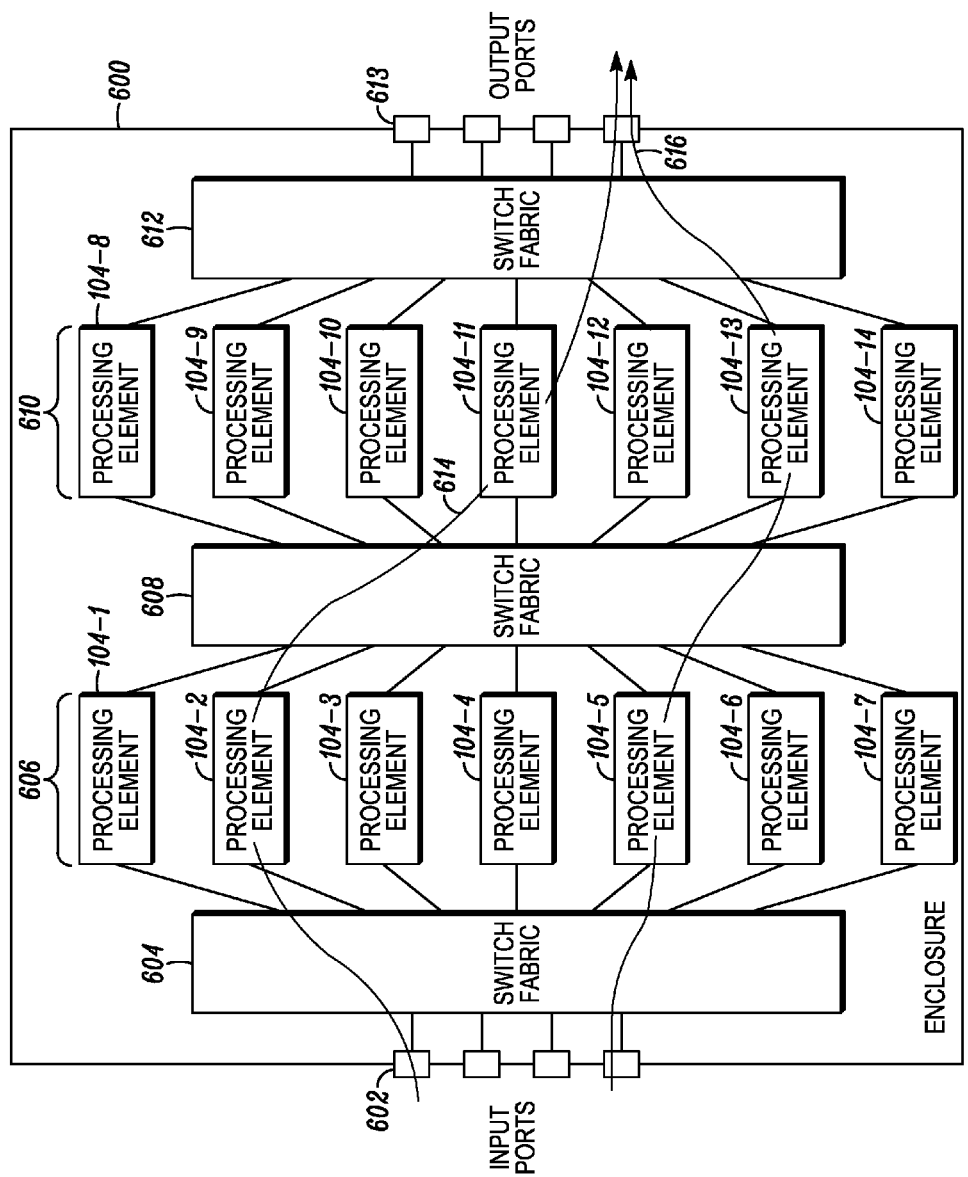
FIG. 6 depicts a first structure for routing packets including video data according to one embodiment.

As discussed above, different networking structures may be used to route packets. FIG. 6 depicts a first structure for routing packets including video data according to one embodiment. An enclosure 600 may be a single device that includes multiple processing elements 104. For example, enclosure 600 may be a multi-channel video processing device. Enclosure 600 includes input ports 602 that receive packets including video data. A switch fabric 604 may route the video packets to a first set of video processing elements 104 shown at 606. A second switch fabric 608 may then route the packets to a second set of video processing elements 104 shown at 610. A third switch fabric 612 may then route the packets through output ports 613. It is noted that although the above structure is shown, other structures within an enclosure will be appreciated.

Video processing elements 104 within enclosure 600 may perform different actions on packets. Additionally, the video may take an unpredictable path through processing elements 104. In one embodiment, a path is shown at 614. In this case, a processing element 104-2 first processes the packet and adds a signature #2 to the packet. Then, a processing element 104-11 processes the packet and adds its signature #11 to the packet. In a second route shown at 616, a processing element 104-5 processes another packet and adds its signature #5. Then, a video processing element 104-13 processes the packet and adds its signature #13.

Figure 7:
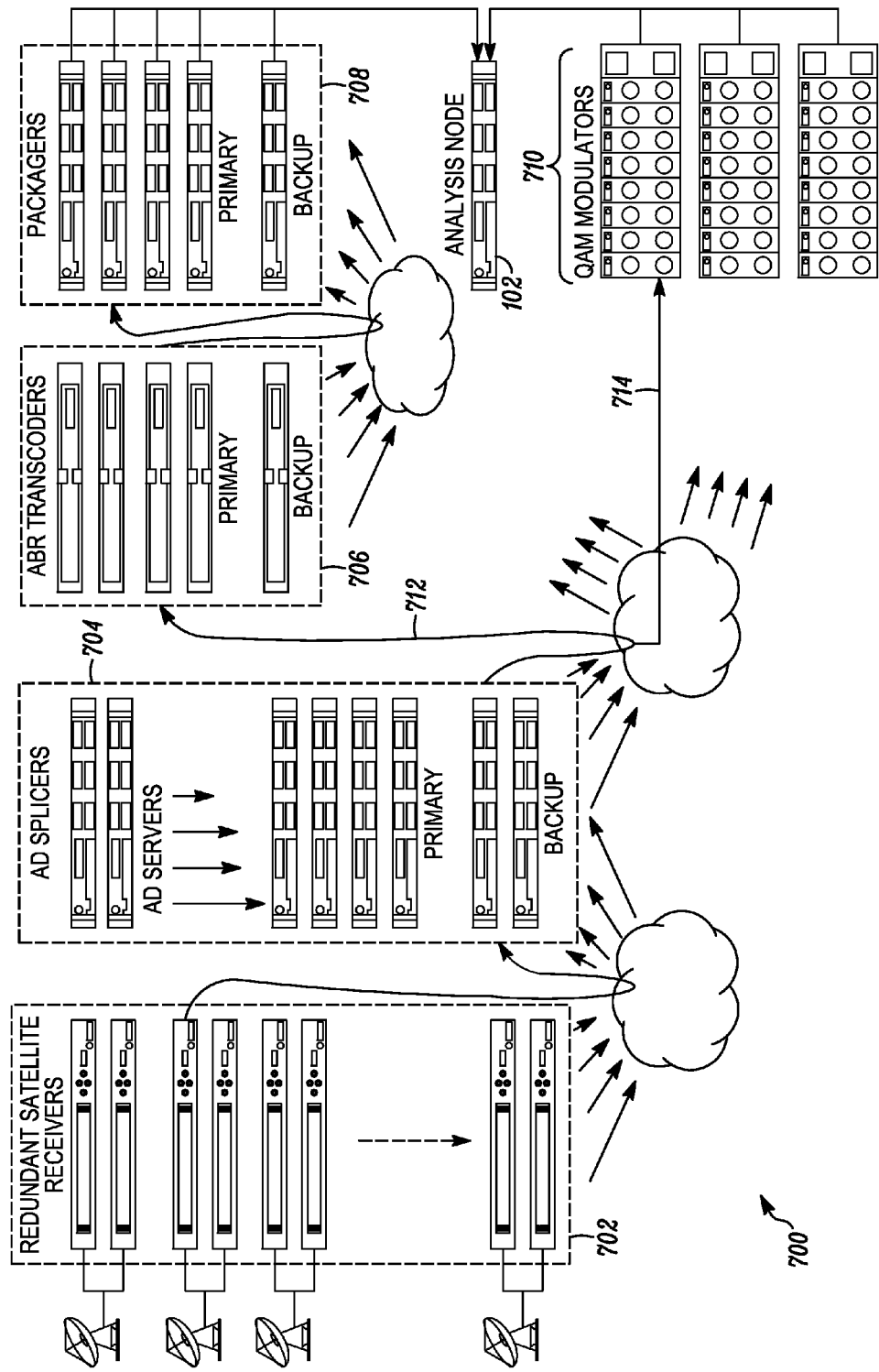
FIG. 7 depicts a system for processing video according to one embodiment.

In another example, FIG. 7 depicts a system 700 for processing video according to one embodiment. System 700 shows a network where processing elements 104 in separate enclosures process packets. At 702, satellite receivers may process the video at the head end and send the video through the network. At 704, the video may be processed to insert information, such as advertisements. After advertisement insertion, the video may be sent through the network. Optionally, additional transcoding may be performed at 706. Also, at 708, packaging may be performed by packagers. The packager cuts video and audio streams into files for delivery to Internet-connected devices, such as smart phones and tablets. In another example, at 710, the packets may be routed using a modulation scheme, such as quadrature amplitude modulation (QAM). After the above processing, the video may be routed to end points 103 and also analysis node 102.

The video may take different paths from the head end to an end point, such as customer premise equipment (CPE). The path may also dynamically change based on fault recovery or load balancing. For example, at 712, a first path is shown. Each processing element 104 that processed the packet may add its signature to the packet. Further, at 714, a second path is shown where a different set of processing elements 104 add their signatures to the packet.

Accordingly, by adding signatures to a packet, particular embodiments are able to better determine which processing elements 104 may be causing a performance degradation. The signatures are added to packets that carry video data according to a syntax defined by a standard for encoding or decoding video. For example, as described above, the signatures may be added to a user data section defined by the syntax.

Figure 8:
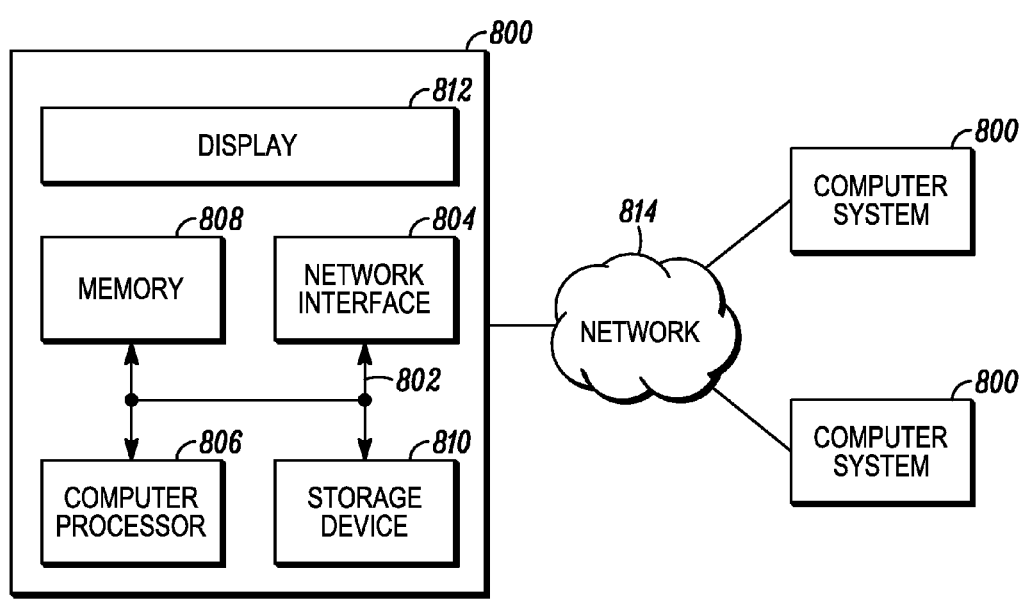
FIG. 8 illustrates an example of a special purpose computer system configured with a video processing system according to one embodiment.

FIG. 8 illustrates an example of a special purpose computer system 800 configured with a video processing system according to one embodiment. Computer system 800 includes a bus 802, network interface 804, a computer processor 806, a memory 808, a storage device 810, and a display 812.

Bus 802 may be a communication mechanism for communicating information. Computer processor 804 may execute computer programs stored in memory 808 or storage device 808. Any suitable programming language can be used to implement the routines of particular embodiments including C, C++, Java, assembly language, etc. Different programming techniques can be employed such as procedural or object oriented. The routines can execute on a single computer system 800 or multiple computer systems 800. Further, multiple processors 806 may be used.

Memory 808 may store instructions, such as source code or binary code, for performing the techniques described above. Memory 808 may also be used for storing variables or other intermediate information during execution of instructions to be executed by processor 806. Examples of memory 808 include random access memory (RAM), read only memory (ROM), or both.

Storage device 810 may also store instructions, such as source code or binary code, for performing the techniques described above. Storage device 810 may additionally store data used and manipulated by computer processor 806. For example, storage device 810 may be a database that is accessed by computer system 800. Other examples of storage device 810 include random access memory (RAM), read only memory (ROM), a hard drive, a magnetic disk, an optical disk, a CD-ROM, a DVD, a flash memory, a USB memory card, or any other medium from which a computer can read.

Memory 808 or storage device 810 may be an example of a non-transitory computer-readable storage medium for use by or in connection with computer system 800. The computer-readable storage medium contains instructions for controlling a computer system to be operable to perform functions described by particular embodiments. The instructions, when executed by one or more computer processors, may be operable to perform that which is described in particular embodiments.

Computer system 800 includes a display 812 for displaying information to a computer user. Display 812 may display a user interface used by a user to interact with computer system 800.

Computer system 800 also includes a network interface 804 to provide data communication connection over a network, such as a local area network (LAN) or wide area network (WAN). Wireless networks may also be used. In any such implementation, network interface 804 sends and receives electrical, electromagnetic, or optical signals that carry digital data streams representing various types of information.

Computer system 800 can send and receive information through network interface 804 across a network 814, which may be an Intranet or the Internet. Computer system 800 may interact with other computer systems 800 through network 814. In some examples, client-server communications occur through network 814. Also, implementations of particular embodiments may be distributed across computer systems 800 through network 814.

Particular embodiments may be implemented in a non-transitory computer-readable storage medium for use by or in connection with the instruction execution system, apparatus, system, or machine. The computer-readable storage medium contains instructions for controlling a computer system to perform a method described by particular embodiments. The computer system may include one or more computing devices. The instructions, when executed by one or more computer processors, may be operable to perform that which is described in particular embodiments.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

The above description illustrates various embodiments along with examples of how aspects of particular embodiments may be implemented. The above examples and embodiments should not be deemed to be the only embodiments, and are presented to illustrate the flexibility and advantages of particular embodiments as defined by the following claims. Based on the above disclosure and the following claims, other arrangements, embodiments, implementations and equivalents may be employed without departing from the scope hereof as defined by the claims.

What is claimed is:

1. A method comprising:
    receiving, by a computing device, packets including video data that was encoded or decoded, wherein the packets are dynamically routed through processing elements in different routes and at least some of the packets include signatures from a plurality of processing elements that processed each respective packet;
    determining, by the computing device, a plurality of captures each including a set of packets;
    determining, by the computing device, for each capture, a set of processing elements that processed the set of packets, wherein the set of processing units inserted respective signatures into a user data section of the packets that is defined by a standard used to encode or decode the video data;

analyzing, by the computing device, the determined set of processing elements for each capture to determine a processing element in the set of processing elements that is considered to be causing a performance degradation; and performing, by the computing device, a remedial action associated with the processing element considered to be causing the performance degradation.

2. The method of claim 1, wherein the user data section comprises a portion of a packet in which data defined by a user and not the standard can be inserted.

3. The method of claim 1, wherein the user data section comprises a unit identifier that identifies an enclosure containing a processing element that processed the packet.

4. The method of claim 1, wherein the user data section comprises a processor identifier that identifies a processing element that processed the packet.

5. The method of claim 1, wherein the user data section comprises an organization identifier that identifies an organization that maintains the signature.

6. The method of claim 1, wherein the user data section comprises a user data type identifier that identifies a data type for the signature for a processing element that processed the packet.

7. The method of claim 1, wherein the user data section is included in a payload byte portion.

8. The method of claim 7, wherein the payload byte portion is a syntax itu_t_t35_payload_byte.

9. The method of claim 8, wherein the signature is inserted into a user identifier portion that includes an organization identifier that identifies an organization that maintains the signature.

10. The method of claim 8, wherein the signature is inserted into a user identifier portion that includes a unit identifier that identifies an enclosure containing a processing element that processed the packet and a processor identifier that identifies a processing element that processed the packet.

11. The method of claim 1, further comprising:
determining a quality of each capture based on a performance in routing of the set of packets in each capture; and
determining the processing element considered to be causing the performance degradation based on the quality of captures in which the processing element is associated with.

12. The method of claim 11, wherein determining the processing element comprises determining that the processing element considered to be causing the performance degradation is a member of captures that are considered to be causing the performance degradation.

13. The method of claim 12, wherein the processing element considered to be causing the performance degradation is not a member of captures that are not considered to be causing the performance degradation.

14. The method of claim 1, wherein performing the remedial action comprises outputting an alert identifying the processing element considered to be causing the performance degradation.

15. A method comprising:
receiving, by a processing element, a packet including video data, wherein the packet is being dynamically routed through processing elements and other packets including other video data are routed in different routes through processing elements;
processing, by the processing element, the video data according to a standard that defines how to encode or decode the video data;
inserting, by the processing element, a signature in a user data section defined by the standard, the signature identifying the processing element; and
routing, by the processing element, the packet including the inserted signature and the processed video data, wherein the signature is included in a plurality of signatures for processing elements that processed the packet, and wherein a plurality of packets with a plurality of signatures for processing elements that processed each respective packet are used to analyze whether the processing element is considered to be causing a performance degradation.

16. The method of claim 15, wherein the user data section comprises a portion of a packet in which data defined by a user and not the standard can be inserted.

17. A non-transitory computer-readable storage medium containing instructions that, when executed, control a computer system to be configured for:
receiving packets including video data that was encoded or decoded, wherein the packets are dynamically routed through processing elements in different routes and at least some of the packets include signatures from a plurality of processing elements that processed each respective packet;
determining a plurality of captures each including a set of packets;
determining for each capture, a set of processing elements that processed the set of packets, wherein the set of processing units inserted respective signatures into a user data section of the packets that is defined by a standard used to encode or decode the video data;
analyzing the determined set of processing elements for each capture to determine a processing element in the set of processing elements that is considered to be causing a performance degradation; and
performing a remedial action associated with the processing element considered to be causing the performance degradation.

18. The non-transitory computer-readable storage medium of claim 17, wherein the user data section comprises a portion of a packet in which data defined by a user and not the standard can be inserted.

19. The non-transitory computer-readable storage medium of claim 17, wherein the user data section comprises a unit identifier that identifies an enclosure containing a processing element that processed the packet.

20. The non-transitory computer-readable storage medium of claim 17, wherein the user data section is included in a payload byte portion.

* * * * *